United States Patent
Maeda et al.

(10) Patent No.: US 8,804,149 B2
(45) Date of Patent: Aug. 12, 2014

(54) IMAGE FORMING APPARATUS WITH PLURALITY OF OPTICAL SCANNING DEVICES

(71) Applicant: KYOCERA Document Solutions Inc., Osaka (JP)

(72) Inventors: Ryota Maeda, Osaka (JP); Hiroshi Yamashita, Osaka (JP); Naoki Iwami, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 13/772,836

(22) Filed: Feb. 21, 2013

(65) Prior Publication Data
US 2013/0222869 A1    Aug. 29, 2013

(30) Foreign Application Priority Data
Feb. 27, 2012   (JP) ................................. 2012-040258

(51) Int. Cl.
*G06F 3/12*    (2006.01)
(52) U.S. Cl.
USPC ............. 358/1.13; 358/2.1; 358/504; 399/44; 399/85; 399/94; 359/206.1; 359/877; 347/261; 347/134; 347/137; 347/17

(58) Field of Classification Search
USPC ......... 358/1.9, 2.1, 1.13, 504; 399/44, 85, 94, 399/4; 359/206.1, 877; 347/261, 128, 134, 347/137, 194, 17
See application file for complete search history.

(56) References Cited

U.S. PATENT DOCUMENTS

| | | | |
|---|---|---|---|
| 2008/0056742 A1* | 3/2008 | Hattori et al. | 399/44 |
| 2008/0068678 A1* | 3/2008 | Suzuki et al. | 358/481 |

FOREIGN PATENT DOCUMENTS

| | | |
|---|---|---|
| JP | 2000-214655 | 8/2000 |
| JP | 2007-83514 | 4/2007 |

* cited by examiner

*Primary Examiner* — Jamares Q Washington
(74) *Attorney, Agent, or Firm* — Gerald E. Hespos; Michael J. Porco; Matthew T. Hespos

(57) ABSTRACT

An image forming apparatus includes a plurality of optical scanning devices, a mode receiver, a temperature condition judger and a temperature adjuster. In the case of forming an image using one optical scanning device, the temperature adjuster drives motors of unused optical scanning devices at a first rotation speed if a predetermined temperature condition is satisfied and drives the motors of the unused optical scanning devices at a second rotation speed slower than the first rotation speed if image formation is finished during the drive at the first rotation speed.

6 Claims, 6 Drawing Sheets

IMAGE FORMING APPARATUS WITH PLURALITY OF OPTICAL SCANNING DEVICES

INCORPORATION BY REFERENCE

This application is based on Japanese Patent Application Serial No. 2012-40258 filed with the Japan Patent Office on Feb. 27, 2012, the contents of which are hereby incorporated by reference.

BACKGROUND

The present disclosure relates to an image forming apparatus with a plurality of optical scanning devices and particularly to a technology for suppressing a scan position shift which occurs due to a temperature difference between optical scanning devices.

Conventionally, an image forming apparatus has been known which includes an image forming unit configured to form a toner image on a surface of a photoconductive drum and provided for each of a plurality of colors. The respective image forming units are arranged along a conveying direction of a recording sheet above a conveyor belt for conveying the recording sheet and transfer toner images of the respective colors to the recording sheet conveyed in the conveying direction in a superimposing manner.

In the image forming apparatus of this type, each image forming unit deflects laser light output from a light source by a scanning lens made using optical resin with good optical properties after reflecting the laser light by a rotational polygon mirror which is driven and rotated, whereby the laser light is scanned across the surface of the photoconductive drum at a constant speed. In this way, an electrostatic latent image is formed on the photoconductive drum surface.

Here, toner images of the respective colors formed on the photoconductive drums by attaching toners to electrostatic latent images need to be transferred in a superimposing manner so as not to cause any position shift on a recording sheet. To this end, a control is executed to adjust write positions (scan positions) of the electrostatic latent images on the surfaces of the photoconductive drums. For example, a control is executed to adjust the operations of the other rotational polygon mirrors so that the rotational polygon mirror in a certain image forming unit and those in the other image forming units rotate with predetermined phase differences.

However, if the temperatures of the respective image forming units differ due to usage frequencies and arranged positions of the respective image forming units, refractive indices of the optical resins forming the scanning lenses may change to be different from each other according to temperature. This may shift laser light paths among the respective image forming units. Even in the case of executing the above control, laser light scan positions may shift among the respective image forming units.

One conventional technology is known which suppresses laser light scan position shifts occurring due to such temperature differences among respective image forming units. According to this conventional technology, when image recording is performed by operating one of a plurality of image forming units, heating means of optical scanning devices in the other image forming units are also operated so that temperature differences of the optical scanning devices in the respective image forming units fall within a predetermined range.

Further, according to another conventional technology, an image of a specific color is formed by rotating a rotational polygon mirror necessary to form the image of the specific color at a rated rotation speed and other rotational polygon mirrors at a rotation speed slower than the rated rotation speed. This enables reductions in noise, vibration, smear of the optical scanning devices and the like while suppressing scan position shifts at the time of image formation.

However, if the rotational polygon motor of one optical scanning device used for image formation is driven at a predetermined rotation speed and the rotational polygon motors of the other unused optical scanning devices are driven at a rotation speed slower than the predetermined rotation speed during single-color image formation, noise and vibration can be reduced, but temperature increase rates of the unused optical scanning devices may be reduced. As a result, it may not be possible to sufficiently reduce temperature differences among the respective optical scanning devices until the next image forming operation. This may cause scan position shifts among the respective optical scanning devices during the next image formation.

An object of the present disclosure is to reduce a possibility of causing scan position shifts among respective optical scanning devices due to temperature differences among the respective optical scanning devices without largely impairing quietness.

SUMMARY

An image forming apparatus according to one aspect of the present disclosure includes a plurality of photoconductors, a plurality of optical scanning devices, a mode receiver, a temperature condition judger and a temperature adjuster.

The optical scanning devices are arranged in correspondence with the plurality of photoconductors, scan the corresponding photoconductors with laser light and each include a light source for emitting laser light, a rotational polygon mirror for reflecting the laser light output from the light source and scanning the photoconductor, a motor for rotating the rotational polygon mirror, and a temperature detector for detecting temperature of the optical scanning device. The mode receiver receives selection of a single-color image forming mode for forming an image using only one of the plurality of optical scanning devices. The temperature condition judger judges whether or not a largest temperature difference out of temperature differences between temperature detected by the temperature detector of the one optical scanning device used in the received single-color image forming mode and temperatures detected by the temperature detectors of unused other optical scanning devices satisfies a temperature condition of being larger than a predetermined first temperature difference. The temperature adjuster performs an image forming operation in the single-color image forming mode and executes a total motor driving process to drive the motors of the other optical scanning devices at a predetermined first rotation speed if the temperature condition is judged to be satisfied by the temperature condition judger and executes a speed switching process to drive the motors of the other optical scanning devices at a second rotation speed slower than the first rotation speed if the image forming operation in the single-color image forming mode is finished during the execution of the total motor driving process when the selection of the single-color image forming mode is received by the mode receiver.

These and other objects, features and advantages of the present disclosure will become more apparent upon reading the following detailed description along with the accompanying drawings.

DETAILED DESCRIPTION

Figure 1:
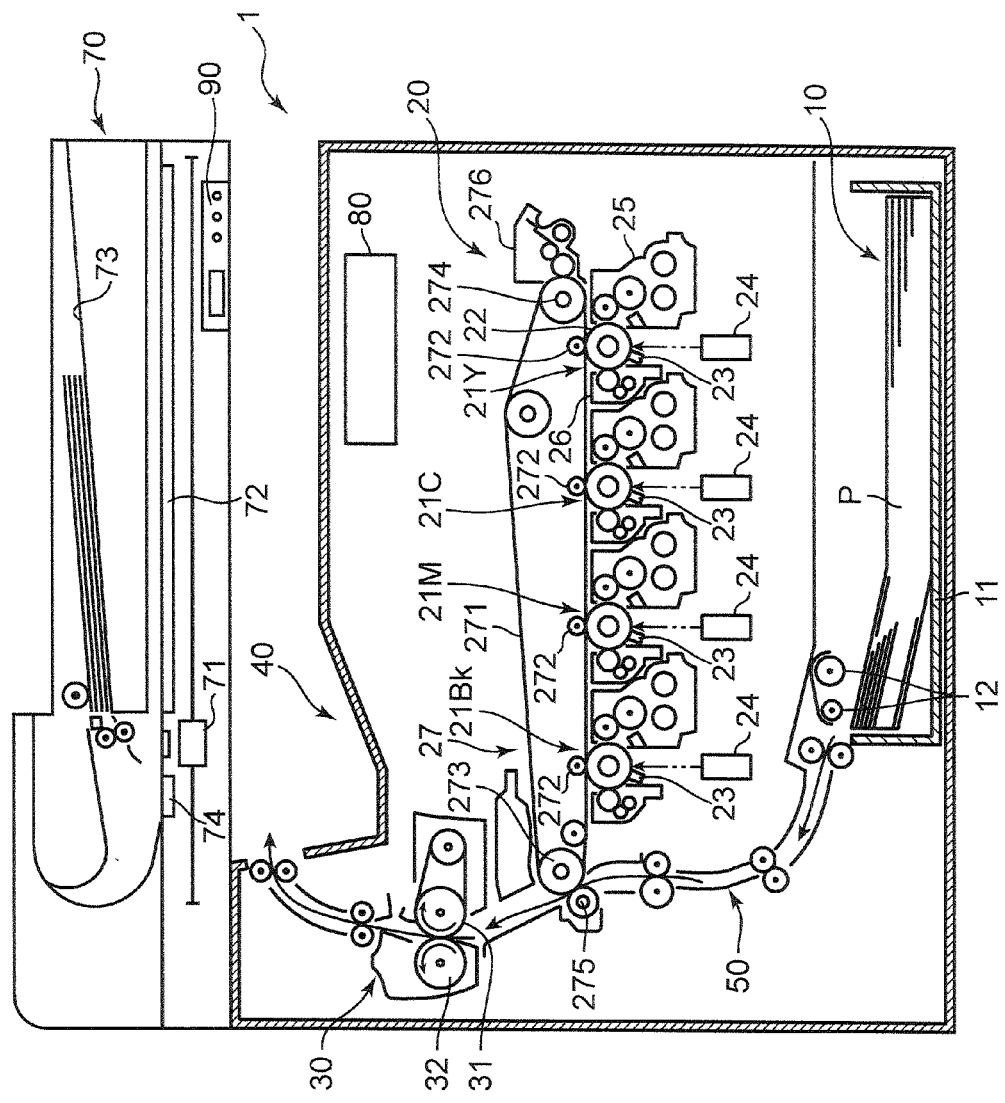
FIG. 1 is a schematic configuration diagram of a complex machine according to one embodiment of an image forming apparatus of the present disclosure.

Hereinafter, an embodiment according to the present disclosure is described based on the drawings. FIG. 1 is a schematic configuration diagram of a complex machine 1 according to one embodiment of an image forming apparatus of the present disclosure.

As shown in FIG. 1, the complex machine 1 includes an image reading unit 70, an operation unit 90, a sheet storage unit 10, an image forming station 20, a fixing unit 30, a sheet discharge unit 40, a sheet conveying unit 50 and a control unit 80.

The image reading unit 70 includes a scanner 71 configured by a CCD (Charge Coupled Device) or the like. The image reading unit 70 reads an image of a document placed on a document platen 72 and generates image data by the scanner 71. Further, the image reading unit 70 successively feeds a plurality of documents stacked on a document placing portion 73 onto a reading window 74 and generates image data by reading images of the documents by the scanner 71 at the position of the reading window 74. A process of the image reading unit 70 for reading an image of a document and generating image data by the scanner 71 is referred to as an image reading process below.

The operation unit 90 includes a touch panel, a numerical keypad and the like and is used by a user to operate functions of the complex machine 1 such as a copy function, a printer function and a scanner function. Specifically, the operation unit 90 outputs an operation instruction (command) and the like by the user to the control unit 80.

The sheet storage unit 10 stores sheets P and picks up a sheet P and feeds it by the control of the control unit 80. The sheet storage unit 10 includes a sheet cassette 11 which is insertable into and withdrawable from an apparatus main body. Pickup rollers 12 for picking up sheets P one by one from a sheet stack are provided on an upstream end of the sheet cassette 11 (left upper side of the sheet cassette 11 in an example shown in FIG. 1). The sheet P picked up from the sheet cassette 11 by driving these pickup rollers 12 is fed to the sheet conveying unit 50.

The image forming station 20 applies an image transfer process to a sheet P under the control of the control unit 80. This transfer process is performed on each sheet P picked up from the sheet stack stored in the sheet storage unit 10 based on image data generated by the image reading unit 70 or image data received by an unillustrated interface circuit from a computer or the like. The interface circuit is connected to an external apparatus such as a computer via a LAN (Local Area Network) or the like and transmits and receives various signals to and from the external apparatus. For example, a network interface (10/100Base-TX) or the like is used as the interface circuit.

The image forming station 20 includes image forming units 21Y, 21C, 21M and 21Bk of respective colors for forming toner images, and a transfer device 27 for transferring toner images formed by these image forming units 21Y, 21C, 21M and 21Bk to a sheet P.

The four image forming units 21Y, 21C, 21M and 21Bk are arranged substantially in a horizontal direction from an upstream side (right side in FIG. 1) to a downstream side. The yellow image forming unit 21Y is arranged on the most upstream side and the cyan image forming unit 21C, the magenta image forming unit 21M and the black image forming unit 21Bk are arranged in this order thereafter. The respective image forming units 21Y, 21C, 21M and 21Bk have a similar configuration and are mounted in the apparatus main body while being positioned to have a predetermined relative positional relationship with the respective devices in the apparatus main body.

Each of the image forming units 21Y, 21C, 21M and 21Bk includes a photoconductive drum (photoconductor) 22, a charger 23, an optical scanning device 24, a developing device 25 and a cleaning device 26. The photoconductive drum 22 is rotatable about a drum shaft extending in forward and backward directions (directions orthogonal to the plane of FIG. 1). The charger 23, the optical scanning device 24, the developing device 25 and the cleaning device 26 are arranged in this order from a position right below the photoconductive drum 22 in a counterclockwise direction, which is a rotating direction of the photoconductive drum 22, along the circumferential surface of the photoconductive drum 22.

The photoconductive drum 22 has the circumferential surface on which an electrostatic latent image and a toner image in conformity with this electrostatic latent image are to be formed.

The charger 23 uniformly charges the circumferential surface of the photoconductive drum 22 rotating counterclockwise about the drum shaft with electric charges. The charger 23 includes a charging roller for applying electric charges to the photoconductive drum 22 while being rotated by having the circumferential surface thereof held in contact with the circumferential surface of the photoconductive drum 22.

The developing device 25 supplies toner to the circumferential surface of the photoconductive drum 22. The toner is attached to an electrostatic latent image on the circumferential surface of the photoconductive drum 22 by the toner supply, whereby a toner image is formed on the circumferential surface of the photoconductive drum 22. Note that yellow (Y) toner is contained in the developing device 25 of the yellow image forming unit 21Y, cyan (C) toner is contained in the developing device 25 of the cyan image forming unit 21C, magenta (M) toner is contained in the developing device 25 of the magenta image forming unit 21M and black (Bk) toner is contained in the developing device 25 of the black image forming unit 21Bk.

The cleaning device 26 performs cleaning by removing the toner remaining on the circumferential surface of the photoconductive drum 22 after primary transfer to be described later. The circumferential surface of the photoconductive drum 22 cleaned by this cleaning device 26 heads for the charger 23 again for the next image forming process.

The optical scanning device 24 irradiates the circumferential surface of the photoconductive drum 22 while being rotated with laser light modulated based on image data. An irradiation position of the laser light is between the charger 23 and the developing device 25. An electrostatic latent image is formed on the circumferential surface of the photoconductive drum 22 by the irradiation of the laser light. The respective optical scanning devices 24 (a plurality of optical scanning devices) in the respective image forming units 21Y, 21C, 21M and 21Bk irradiate laser light corresponding to the respective colors of yellow, cyan, magenta and black to the photoconductive drums 22 in the respective image forming units 21Y, 21C, 21M and 21Bk. When the laser light is irradiated to the uniformly charged circumferential surface of the photoconductive drum 22, electric charges in that irradiated part are erased according to the intensity of the laser light. In this way, the electrostatic latent image is formed on the circumferential surface of the photoconductive drum 22.

Note that the image data are, for example, generated by applying known processings such as a color correction processing to yellow, cyan, magenta and black image data generated from a read document image by the image reading unit 70 or yellow, cyan, magenta and black image data received by the unillustrated interface circuit.

The transfer device 27 is a device for transferring the toner images formed on the circumferential surfaces of the photoconductive drums 22 to a sheet P. The transfer device 27 includes an intermediate transfer belt 271, primary transfer rollers 272, a drive roller 273, a driven roller 274 and a secondary transfer roller 275.

The intermediate transfer belt 271 is an endless belt and mounted right above the respective image forming units 21Y, 21C, 21M and 21Bk by a plurality of primary transfer rollers 272, the drive roller 273 and the driven roller 274. The intermediate transfer belt 271 is rotatable clockwise by a rotational drive force of the drive roller 273.

The respective primary transfer rollers 272 are arranged to face the respective photoconductive drums 22 of the respective image forming units 21Y, 21C, 21M and 21Bk. The respective primary transfer rollers 272 press the intermediate transfer belt 271 to prevent the lift of the intermediate transfer belt 271 from the photoconductive drums 22. A primary transfer bias is applied to each primary transfer roller 272. When the primary transfer bias is applied to the primary transfer roller 272, the toner image formed on the circumferential surface of the photoconductive drum 22 is primarily transferred to the intermediate transfer belt 271.

The secondary transfer roller 275 is arranged at a position to face the drive roller 273 on the outer circumferential surface of the intermediate transfer belt 271. A secondary transfer bias is applied to the secondary transfer roller 275. When the secondary transfer bias is applied to the secondary transfer roller 275, the toner images primarily transferred to the intermediate transfer belt 271 are secondarily transferred to a sheet P.

A cleaning device 276 for the intermediate transfer belt is provided at the right side of the driven roller 274 in FIG. 1. The toner remaining on the surface of the intermediate transfer belt 271 after the secondarily transfer of the toner images to the sheet P is removed by this cleaning device 276 for the intermediate transfer belt. The surface of the intermediate transfer belt 271 cleaned in this way heads for the photoconductive drums 22.

The fixing unit 30 applies a fixing process by heating to the sheet P carrying the secondarily transferred toner images under the control of the control unit 80. The fixing unit 30 includes a heat roller 31 in which an electric heating element is mounted and a pressure roller 32 arranged such that the circumferential surface thereof faces that of this heat roller 31. The sheet P after the secondary transfer passes a nip portion between the heat roller 31 that is driven and rotated clockwise about a roller shaft and the pressure roller 32 that rotates counterclockwise about a roller shaft following the rotation of the heat roller 31, whereby the fixing process is applied by obtaining heat from the heat roller 31. The sheet P to which the fixing process was applied is discharged to the sheet discharge unit 40 by the sheet conveying unit 50.

The sheet P to which the fixing process was applied in the fixing unit 30 is discharged to the sheet discharge unit 40, which stores this discharged sheet P.

The sheet conveying unit 50 drives rollers for conveying a sheet under the control of the control unit 80. In this way, the sheet conveying unit 50 conveys a sheet P fed from the sheet storage unit 10 to the sheet discharge unit 40 via the image forming station 20 and the fixing unit 30.

The control unit 80 is connected to the sheet storage unit 10, the image forming station 20, the fixing unit 30, the sheet conveying unit 50, the image reading unit 70, the operation unit 90 and the like and controls the operations of these units. The control unit 80 is, for example, configured by a microcomputer including a CPU (Central Processing Unit), a ROM (Read Only Memory) storing various programs to be executed by the CPU, data necessary for the execution of these programs and the like, a RAM (Random Access Memory) which is a so-called working memory of the CPU, peripheral circuits of the CPU and the like.

An image forming operation in the thus configured complex machine 1 is described. First, after the circumferential surface of the photoconductive drum 22 is uniformly charged by the charger 23, the circumferential surface is exposed to light by the optical scanning device 24. In this way, an electrostatic latent image is formed on the circumferential surface of the photoconductive drum 22. This electrostatic latent image is developed with the toner supplied by the developing device 25. The toner image formed on the surface of the photoconductive drum is transferred onto the intermediate transfer belt 271 by a transfer bias applied to the primary transfer roller 272. The residual toner remaining on the photoconductive drum 22 without being transferred to the intermediate transfer belt 271 is cleaned by the cleaning device 26 and collected into an unillustrated collection bottle. Such exposing, developing and primary transfer operations are successively performed for each of development colors of yellow, cyan, magenta and black. Toner images of the respective colors are superimposed on the surface of the intermediate transfer belt 271 to form a full-color toner image on the intermediate transfer belt 271.

The full-color toner image primarily transferred to the intermediate transfer belt 271 is secondarily transferred to a sheet P timely conveyed from the sheet storage unit 10 to a transfer position by the sheet conveying unit 50 in a secondary transfer portion where the secondary transfer roller 275 and the intermediate transfer belt 271 are in contact. During this secondary transfer, a secondary transfer bias is applied to the secondary transfer roller 275. The full-color toner image transferred to the sheet P is fixed to the sheet P by heating and pressing by the fixing unit 30. Thereafter, this sheet P is discharged to the sheet discharge unit 40. Note that the toner remaining on the intermediate transfer belt 271 is collected by the cleaning device 276 for the intermediate transfer belt for cleaning the surface of the intermediate transfer belt 271 and collected into the unillustrated collection bottle.

Figure 2:
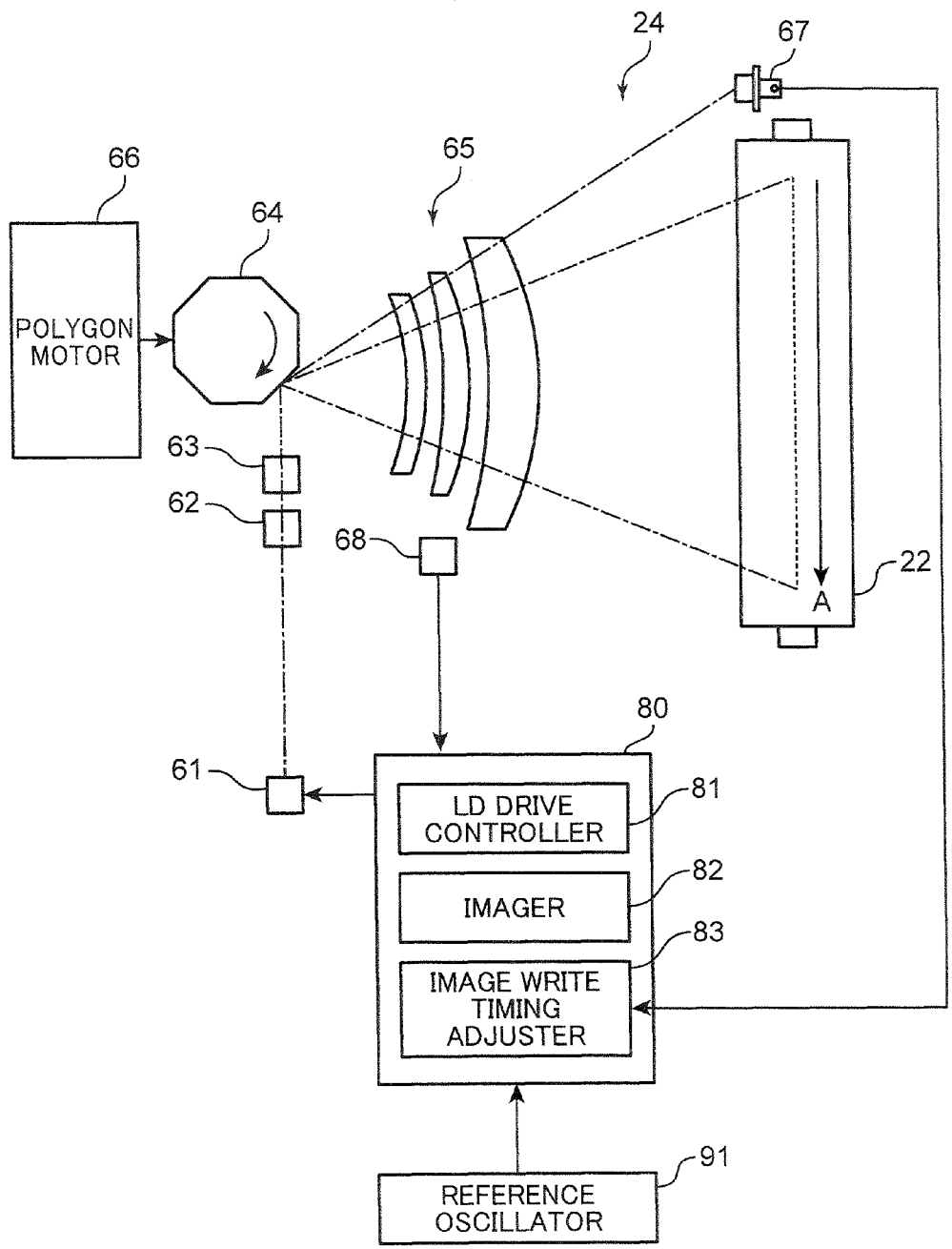
FIG. 2 is a schematic configuration diagram showing the internal configuration of an optical scanning device according to the embodiment.

FIG. 2 is a schematic configuration diagram showing an example of the internal configuration of the optical scanning device 24. Note that since the configurations of the optical scanning devices 24 in the respective image forming units 21Y, 21C, 21M and 21Bk are similar, the following description is made, taking the image forming unit 21Bk as an example.

The optical scanning device 24 includes a laser emitter (light source) 61, a collimator lens 62, a prism 63, a polygon mirror (rotational polygon mirror) 64, an fθ lens 65, a polygon motor (motor) 66, a beam detect sensor (hereinafter, BD (Beam Detect) sensor) 67, and a temperature sensor (temperature detector) 68. Note that the control unit 80 is electrically connected to each optical scanning device 24.

The laser emitter 61 includes a laser light source such as a laser diode (LD) for emitting laser light. Laser light output from the laser light source is converted into parallel light by the collimator lens 62, the prism 63 and the like. This parallel light is reflected toward the polygon mirror 64 by an unillustrated reflecting mirror and incident on the polygon mirror 64 rotated by driving the polygon motor 66.

The polygon mirror 64 includes a plurality of reflecting surfaces for reflecting the laser light output from the laser emitter 61 toward the photoconductive drum 22 and scanning the circumferential surface of the photoconductive drum 22 with this laser light (for example, there are eight reflecting surfaces in FIG. 2). The polygon mirror 64 is driven and rotated, for example, in an arrow direction of FIG. 2 at a constant speed by the polygon motor 66, whereby the laser light emitted from the laser emitter 61 is reflected by the respective reflecting surfaces of the polygon mirror 64.

The fθ lens 65 (optical lens made of resin) is formed by, for example, mold-forming optical resin with good optical properties. The fθ lens 65 condenses the laser light reflected by the polygon mirror 64 and focuses it on the circumferential surface of the photoconductive drum 22. By this laser light, the circumferential surface of the photoconductive drum 22 is scanned at a constant speed in a rotary axis direction (main scanning direction, direction of arrow A of FIG. 2) to erase electric charges on the circumferential surface of the photoconductive drum 22. In this way, an electrostatic latent image is formed on the circumferential surface of the photoconductive drum 22.

The BD sensor 67 includes, for example, a photodiode and used to adjust a timing at which beam scanning (hereinafter, referred to as an image writing operation) for forming a toner image (electrostatic latent image) is performed on the photoconductive drum 22. When the laser light reflected by the polygon mirror 64 rotating in the arrow direction shown in FIG. 2 is incident on the BD sensor 67 through the fθ lens 65, a detection signal is output from the BD sensor 67. The detection signal of the BD sensor 67 is input to an image write timing adjuster 83 to be described later and used to adjust an image write timing of the laser light for scanning the circumferential surface of the photoconductive drum 22.

The temperature sensor 68 detects the temperature of the corresponding optical scanning device 24. Specifically, the temperature sensor 68 is arranged outside a laser light path and within a predetermined short distance from the fθ lens 65 in a housing forming an outer body of the optical scanning device 24. The temperature sensor 68 detects temperature near the fθ lens 65 and outputs a detection signal indicating this detected temperature to the control unit 80.

A refractive index of the fθ lens 65 is changed by temperature near the vicinity of the fθ lens 65. Thus, if there are differences between temperatures near the fθ lenses 65 among the respective optical scanning devices 24, refractive indices of the fθ lenses 65 are made different among the respective optical scanning devices 24 by this. Thus, a moving speed of the laser light in the main scanning direction (main scanning magnification) may change among the respective optical scanning devices 24. Therefore, as described later, the respective optical scanning devices 24 are temperature-controlled by the control unit 80 to reduce differences between the temperatures near the fθ lenses 65 among the respective optical scanning devices 24. The detection signal of the temperature sensor 68 is used for the temperature control of each optical scanning device 24.

The complex machine 1 includes a reference oscillator 91 for generating a reference clock signal. The control unit 80 obtains an operation timing by the reference clock signal output from the reference oscillator 91. The control unit 80 adjusts an image write timing in accordance with the operation timing in controlling the drive of the laser emitter 61 based on image data of an image to be written.

The control unit 80 functions particularly as an LD drive controller 81, an imager 82 and the image write timing adjuster 83 to control laser light scanning by the optical scanning device 24.

The LD drive controller 81 controls the drive of the laser emitter 61 based on an instruction from the imager 82. The imager 82 starts the drive of the LD drive controller 81 based on image data of an image to be written. The image write timing adjuster 83 adjusts an image write timing, at which the laser light is scanned across the surface of the photoconductive drum 22, based on a BD signal output from the BD sensor 67 and outputs it to the imager 82.

Figure 3:
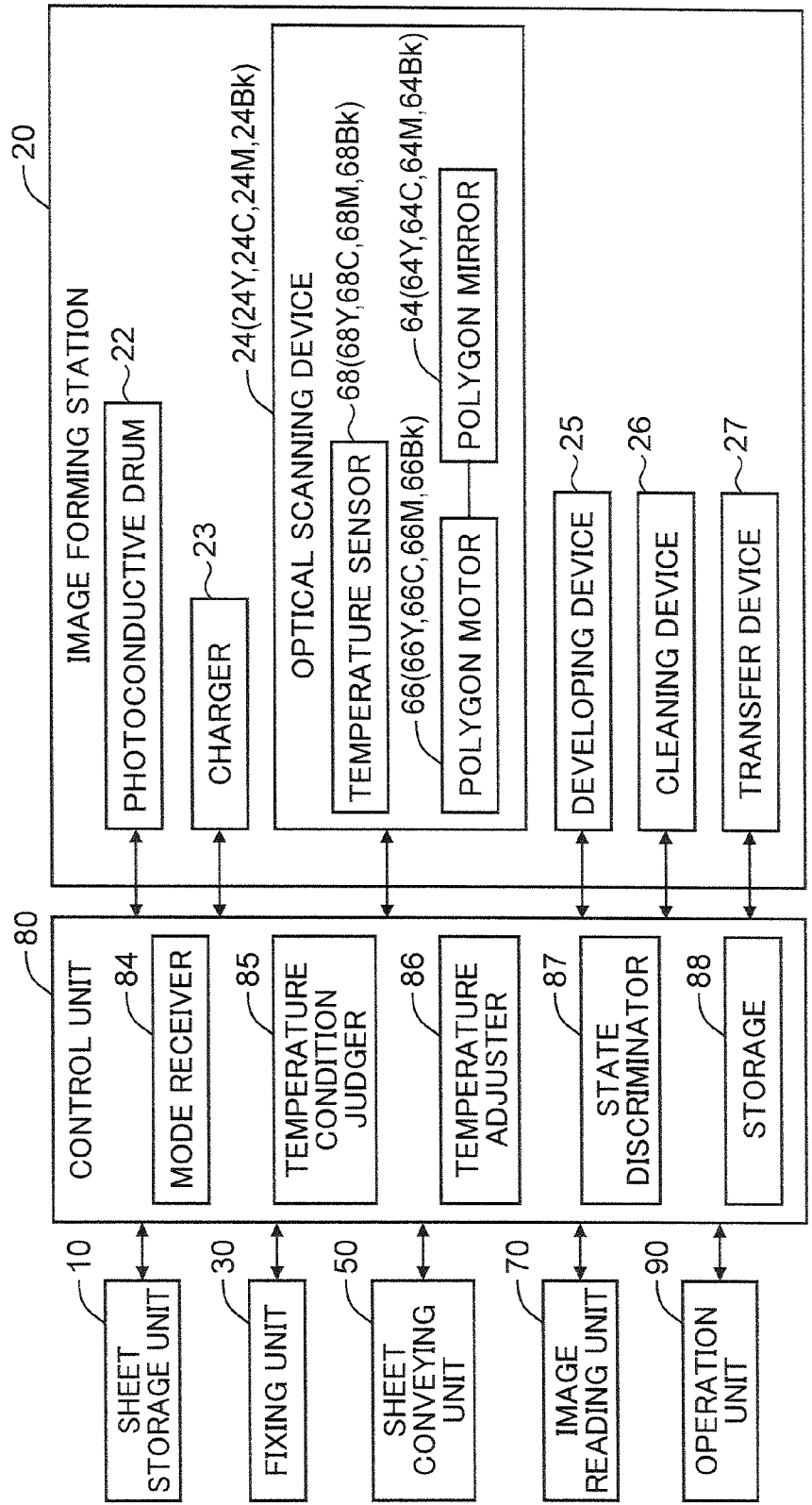
FIG. 3 is a block diagram showing the electrical configuration of the complex machine.

FIG. 3 is a block diagram showing the electric configuration of the complex machine 1. Note that, in the following description, the optical scanning devices 24 of the respective colors of yellow Y, cyan C, magenta M and black Bk are respectively denoted by "24Y", "24C", "24M" and "24Bk". Further, the polygon mirrors 64 of the optical scanning devices 24Y, 24C, 24M and 24Bk of the respective colors of yellow Y, cyan C, magenta M and black Bk are respectively denoted by "64Y", "64C", "64M" and "64Bk". Further, the polygon motors 66 of the optical scanning devices 24Y, 24C, 24M and 24Bk of the respective colors of yellow Y, cyan C, magenta M and black Bk are respectively denoted by "66Y", "66C", "66M" and "66Bk". Furthermore, the temperature sensors 68 of the optical scanning devices 24Y, 24C, 24M and 24Bk of the respective colors of yellow Y, cyan C, magenta M and black Bk are respectively denoted by "68Y", "68C", "68M" and "68Bk".

The control unit 80 functions to particularly include a mode receiver 84, a temperature condition judger 85 and a temperature adjuster 86, a state discriminator 87 and a storage 88 in association with the temperature control of the optical scanning devices 24Y, 24C, 24M and 24Bk of the respective colors of yellow Y, cyan C, magenta M and black Bk.

The mode receiver 84 receives selection of a single-color image forming mode for forming an image using only one of the plurality of optical scanning devices 24. Specifically, the mode receiver 84 determines whether an image to be written is a monochrome image or a full-color image based on image data of the image to be written and receives the selection of the single-color image forming mode when the image to be written is determined to be a monochrome image as a result of the determination.

Note that, without being limited to this, the mode receiver 84 may be configured to receive the selection of the single-color image forming mode by receiving an operation input of an instruction to form an image using only the optical scanning device 24 of any one of yellow Y, cyan C, magenta M and black Bk from a user via the operation input unit 90.

The temperature condition judger 85 judges whether or not a largest temperature difference out of temperature differences between temperature detected by the temperature sensor of the optical scanning device 24 of any one color used for image formation out of yellow Y, cyan C, magenta M and black Bk and temperatures detected by the temperature sensors 68 of the optical scanning devices 24 other than the optical scanning device of the one color satisfies a temperature condition of being larger than a predetermined first temperature difference. Hereinafter, the optical scanning devices 24 other than the optical scanning device 24 of one color used for image formation are referred to as unused optical scanning devices.

For example, if the optical scanning device 24 used for image formation is of black Bk, the temperature condition judger compares temperature detected by the temperature sensor 68Bk and those detected by the temperature sensors 68Y, 68C and 68M of yellow Y, cyan C and magenta M and specifies the largest temperature difference. For example, if the temperature difference from the temperature detected by the temperature sensor 68M of magenta M is largest, the temperature condition judger 85 judges whether or not the temperature difference between the detected temperature by the temperature sensor 68Bk and that by the temperature sensor 68M satisfies the temperature condition. Note that the first temperature difference is determined in advance based on an experimental value such as one obtained in trial operation, and stored in the ROM.

The temperature adjuster 86 executes the total motor driving process if the temperature condition is judged to be satisfied by the temperature condition judger 85 when the selection of the single-color image forming mode is received by the mode receiver 84. This total motor driving process is a driving process for not only driving the polygon motor 66 of one optical scanning device 24 at a predetermined scanning rotation speed for image formation, but also driving the polygon motors 66 of the unused optical scanning devices at a predetermined first rotation speed.

The temperature adjuster 86 executes a speed switching process if the image formation in the single-color image forming mode is finished during the total motor driving process. This speed switching process is a process for driving the polygon motors 66 of the unused optical scanning devices at a second rotation speed slower than the first rotation speed.

Further, the temperature adjuster 86 stops the polygon motors 66 of the unused optical scanning devices 24 if the largest temperature difference out of the temperature differences between the temperature detected by the temperature sensor 68 of the one optical scanning device 24 used for image formation and the temperatures detected by the temperature sensors 68 of the unused optical scanning devices becomes smaller than a second temperature difference smaller than the first temperature difference while the total motor driving process is executed and the polygon motors 66 of all the optical scanning devices 24 are driven. In this way, the temperature adjuster 86 finishes the total motor driving process.

For example, if the optical scanning device 24 used for image formation is of black Bk, the temperature adjuster 86 compares the temperature detected by the temperature sensor 68Bk and those detected by the temperature sensors 68Y, 68C and 68M of yellow Y, cyan C and magenta M and specifies the largest temperature difference during the execution of the total motor driving process. For example, if the temperature difference from the temperature detected by the temperature sensor 68Y of yellow Y is largest, the temperature adjuster 86 judges whether or not the temperature difference between the detected temperature by the temperature sensor 68Bk and that by the temperature sensor 68Y is smaller than the second temperature difference. If this temperature difference is smaller than the second temperature difference, the temperature adjuster 86 stops the polygon motors 66Y, 66C and 66M. Note that the second temperature difference is determined to be smaller than the first temperature difference based on an experimental value such as one obtained in trial operation, and stored in the ROM.

The state discriminator 87 discriminates in which of a plurality of possible operating states except the execution of the image forming operation the complex machine 1 is set. The plurality of operating states include, for example, an image reading state in which the image reading unit 70 is executing the image reading process and a standby state in which the image reading unit 70 is not executing the image reading process.

Individual rotation speeds determined in correspondence with the respective possible operating states of the complex machine 1 other than the execution of image formation are stored in the storage 88 in advance. These individual rotation speeds correspond to the second rotation speeds individually determined for the respective operating states. The individual rotation speed corresponding to each operating state is determined, for example, based on an experimental value such as one obtained in trial operation. Specifically, the individual rotation speed corresponding to each operating state is slower than the first rotation speed V1 and so determined that noise generated in driving the polygon motors 66 of the unused optical scanning devices at the individual rotation speed when the complex machine is in each operating state is at a magnitude permissible for users.

For example, a first individual rotation speed V21 corresponding to the image reading state is stored in the storage 88. The first individual rotation speed V21 corresponding to the image reading state is slower than the first rotation speed V1 and so determined that noise generated in driving the polygon motors 66 of the unused optical scanning devices at the first individual rotation speed V21 when the complex machine 1 is in the image reading state and noise is generated by the image reading unit 70 executing the image reading process is at a magnitude permissible for users.

Further, a second individual rotation speed V22 corresponding to the standby state is stored in the storage 88. The second individual rotation speed V22 corresponding to the standby state is slower than the first individual rotation speed V21 corresponding to the image reading state and so determined that noise generated in driving the polygon motors 66 of the unused optical scanning devices at the second individual rotation speed V22 when the complex machine 1 is in the standby state, neither the image forming operation nor the image reading process is performed and almost no noise is generated is at a magnitude permissible for users.

The temperature adjuster 86 drives the polygon motors 66 of the unused optical scanning devices at the second rotation speed corresponding to the operating state discriminated by the state discriminator 87 in the case of executing the speed switching process.

Figure 4:
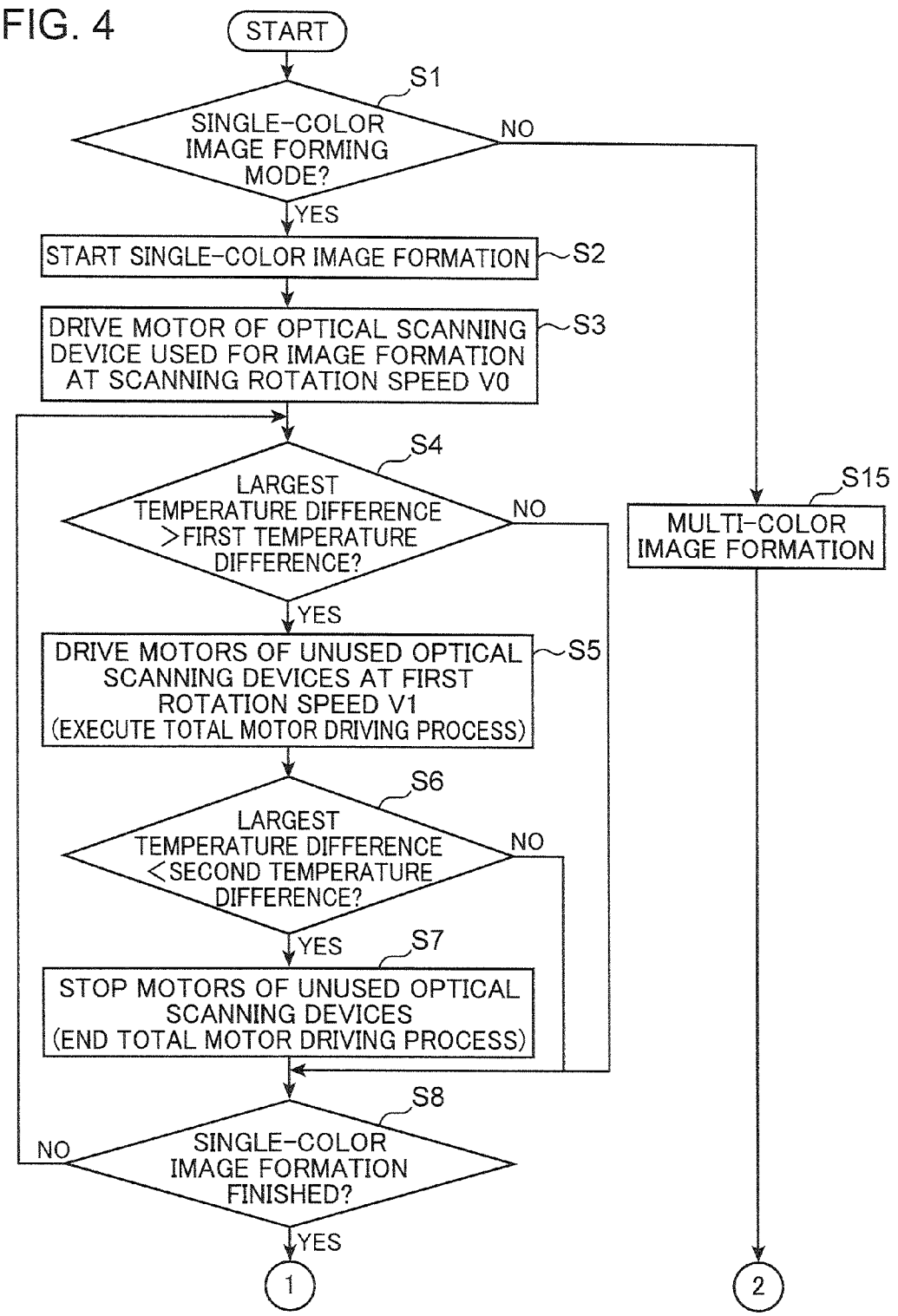
FIG. 4 is a flow chart showing a first half of a temperature control operation of respective optical scanning devices during single-color image formation.
Figure 5:
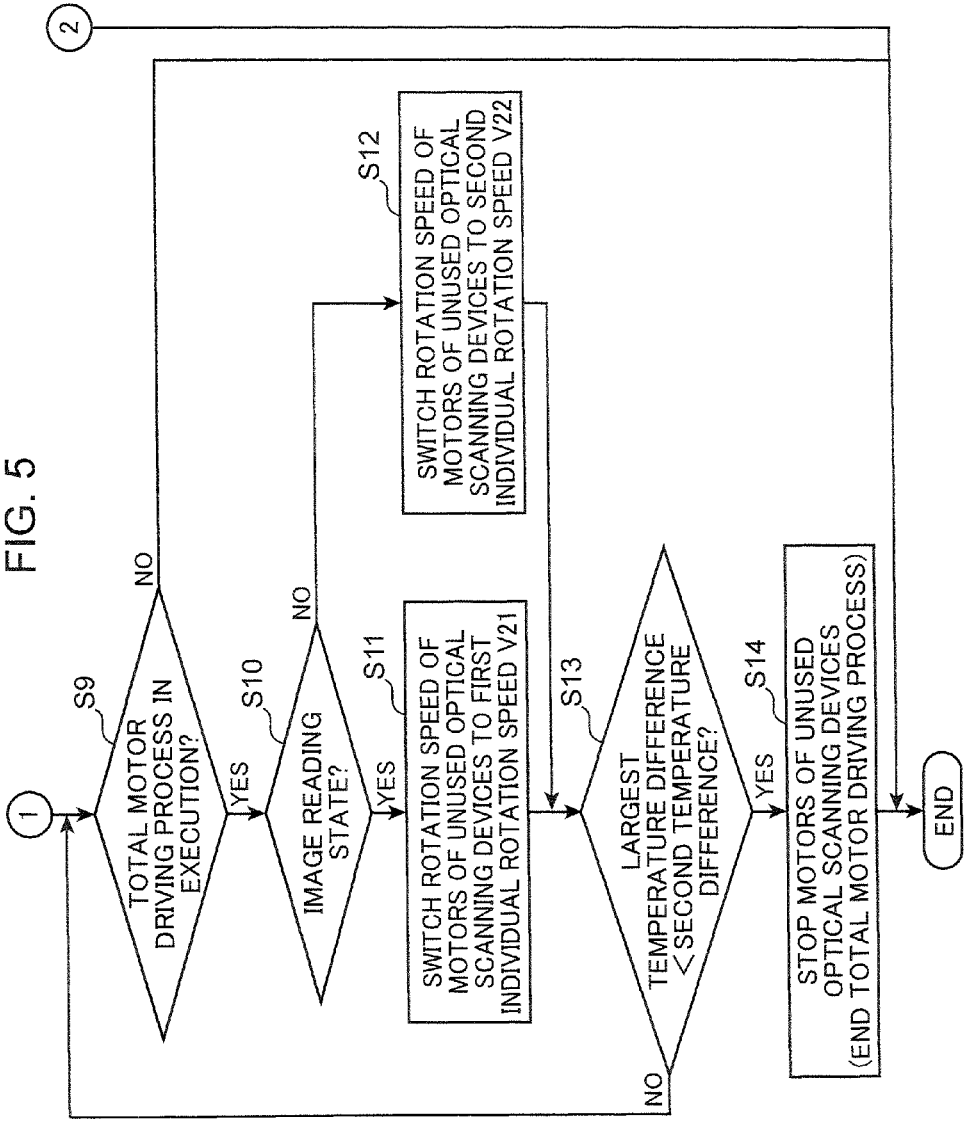
FIG. 5 is a flow chart showing a second half of the temperature control operation of the respective optical scanning devices during the single-color image formation.
Figure 6:
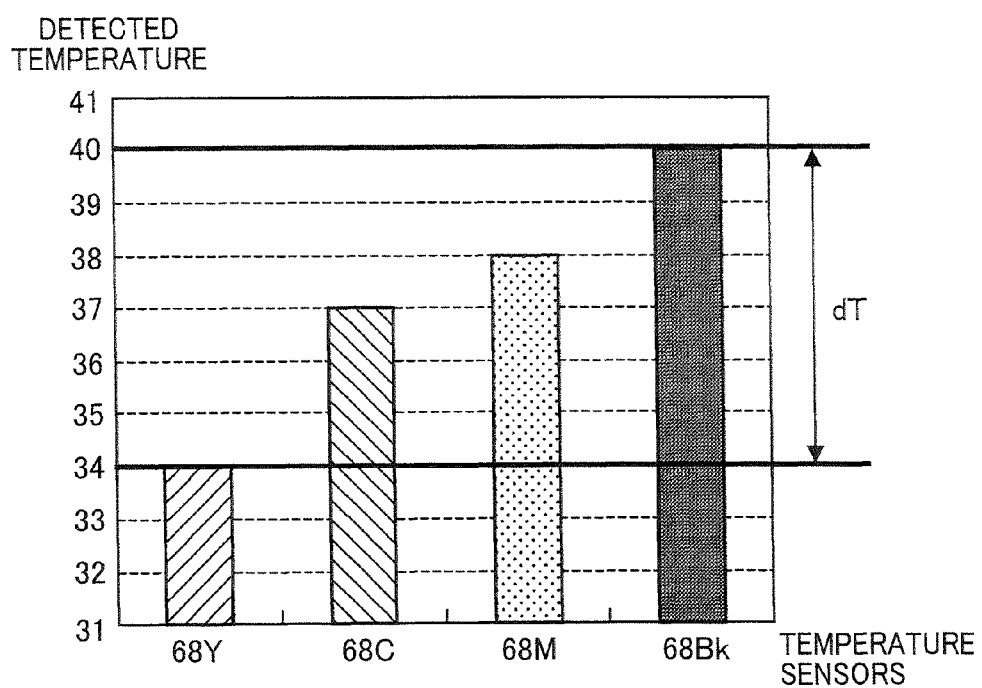
FIG. 6 is a graph showing an example of temperatures detected by respective temperature detectors.

A temperature control operation of the optical scanning devices 24Y, 24C, 24M and 24Bk of the respective colors of yellow Y, cyan C, magenta M and black Bk is described below using FIGS. 4 to 6. FIGS. 4 and 5 are a flow chart showing the temperature control operation of the optical scanning devices 24Y, 24C, 24M and 24Bk of the respective colors of yellow Y, cyan C, magenta M and black Bk during single-color image formation. FIG. 6 is a graph showing an example of temperatures near the fθ lenses 65 of the optical scanning devices 24Y, 24C, 24M and 24Bk of the respective colors of yellow Y, cyan C, magenta M and black Bk detected by the respective temperature sensors 68Y, 68C, 68M and 68Bk.

In the following description, image formation using the optical scanning device 24Bk of black Bk is performed during single-color image formation as a specific example. In accordance with this, the unused optical scanning devices are the optical scanning devices 24Y, 24C and 24M of yellow Y, cyan C and magenta M.

When receiving, for example, an operation input of an instruction to start the copy function from a user via the operation unit 90, the control unit 80 starts an image forming operation on a sheet based on image data generated by an image forming process after causing the image reading unit 70 to execute the image reading process. When the selection of the single-color image forming mode is received based on the generated image data by the mode receiver 84 (S1; YES), the control unit 80 starts image formation using the optical scanning device 24Bk of black Bk (S2) and starts driving the polygon motor 66Bk at a predetermined scanning rotation speed V0 (S3).

Thereafter, laser light output at a predetermined timing by the drive control of the laser emitter 61 by the control unit is reflected (deflected) toward the surface of the photoconductive drum 22 by the polygon mirror 64Bk that has been started to be driven. Note that the scanning rotation speed V0 is, for example, set at a rotation speed suitable to scan the photoconductive drum 22 substantially at a constant speed with the laser light reflected and deflected by the polygon motor 64Bk based on an experimental value such as one obtained in trial operation.

On the other hand, if the selection of the single-color image forming mode has not been received by the mode receiver 84 (S1; NO), image formation using the optical scanning devices 24 of a plurality of colors is performed by the control unit 80 (S15).

When the drive of the polygon motor 66Bk of the optical scanning device 24Bk of black Bk used for image formation is started (S3), the temperature adjuster 86 causes the respective temperature sensors 68Y, 68C, 68M and 68Bk to detect temperatures near the fθ lenses 65 of the optical scanning devices 24Y, 24C, 24M and 24Bk of the respective colors. Then, the temperature adjuster calculates each of temperature differences between the temperature detected by the temperature sensor 68Bk of the optical scanning device 24Bk of black Bk and the temperatures detected by the temperature sensors 68Y, 68C and 68M of the unused optical scanning devices 24Y, 24C and 24M. Further, the temperature adjuster 86 judges whether or not the largest temperature difference out of these temperature differences satisfies the temperature condition of being larger than the first temperature difference (S4).

As a specific example, it is assumed below that the temperatures near the fθ lenses 65 of the optical scanning devices 24Y, 24C, 24M and 24Bk of the respective colors detected by the respective temperature sensors 68Y, 68C, 68M and 68Bk are respectively 34° C., 37° C., 38° C. and 40° C. in Step S4, for example, as shown in FIG. 6.

After the execution of Step S3, the temperature condition judger 85 judges whether or not the largest temperature difference out of the temperature differences between the temperature detected by the temperature sensor 68Bk of the optical scanning device 24Bk of black Bk used for image formation and the temperatures detected by the temperature sensors 68Y, 68C and 68M of the unused optical scanning devices 24Y, 24C and 24M, i.e. a temperature difference dT (6° C.) between the temperature detected by the optical scanning device 24Bk of black Bk (40° C.) and the temperature detected by the optical scanning device 24Y of yellow Y (34° C.) satisfies the temperature condition of being larger than the first temperature difference (S4).

Here, the first temperature difference is, for example, set at 5° C. In this case, the largest temperature difference dT (6° C.) out of the temperature differences between the temperature detected by the temperature sensor 68Bk of the optical scanning device 24Bk of black Bk used for image formation and the temperatures detected by the temperature sensors 68Y, 68C and 68M of the optical scanning devices 24Y, 24C and 24M is larger than the first temperature difference (5° C.). Thus, the temperature condition judger 85 judges that the temperature condition is satisfied (S4; YES).

If the temperature condition is judged to be satisfied by the temperature condition judger 85 (S4; YES), the temperature adjuster 86 executes the total motor driving process. In this way, the temperature adjuster 86 drives only the polygon motor 66Bk of the optical scanning device 24Bk of black Bk that has been started to be driven in Step S3, but also the polygon motors 66Y, 66C and 66M of the unused optical scanning devices 24Y, 24C and 24M. Further, the temperature adjuster 86 stores information indicating the ongoing total motor driving process in the RAM (S5).

Note that the temperature adjuster 86 drives the polygon motors 66Y, 66C and 66M of the unused optical scanning devices 24Y, 24C and 24M at the predetermined first rotation speed V1 in Step S5. The first rotation speed V1 is, for example, determined based on an experimental value such as one obtained in trial operation. Specifically, noise is generated when the polygon motors 66Y, 66C and 66M of the unused optical scanning devices 24Y, 24C and 24M are driven during image formation in the single-color image forming mode. The rotation speed of the polygon motors 66Y, 66C and 66M of the unused optical scanning devices 24Y, 24C and 24M when this noise is at a magnitude permissible for users is determined to be the first rotation speed V1. However, without being limited to this, the first rotation speed V1 may be determined to be a rotation speed equal to the scanning rotation speed V0 or slower than the scanning rotation speed V0.

The temperature adjuster 86 causes the respective temperature sensors 68Y, 68C, 68M and 68Bk to detect the temperatures near the fθ lenses 65 of the optical scanning devices 24Y, 24C, 24M and 24Bk of the respective colors again. When the largest temperature difference out of the temperature differences between the temperature detected by the temperature sensor 68Bk of the optical scanning device 24Bk of black Bk and the temperatures detected by the temperature sensors 68Y, 68C and 68M of the unused optical scanning devices 24 falls below the second temperature difference (e.g. 3° C.) smaller than the first temperature difference (5° C.) (S6; YES), the temperature adjuster 86 stops the drive of the polygon motors 66Y, 66C and 66M of the unused optical scanning devices 24Y, 24C and 24M driven in Step S5. In this way, the temperature adjuster 86 finishes the total motor driving process. Further, the temperature adjuster 86 deletes the information indicating the ongoing total motor driving process from the RAM (S7).

On the other hand, if the largest temperature difference out of the temperature differences between the temperature detected by the temperature sensor 68Bk of the optical scanning device 24Bk of black Bk and the temperatures detected by the temperature sensors 68Y, 68C and 68M of the unused optical scanning devices 24Y, 24C and 24M is not smaller than the second temperature difference (3° C.) in Step S6 (S6; NO), the temperature adjuster 86 does not stop the polygon motors 66Bk, 66Y, 66C and 66M.

If the temperature condition is judged not to be satisfied by the temperature condition judger 85 (S4; NO) or if the largest temperature difference is not smaller than the second temperature difference (3° C.) in Step S6 (S6; NO) and if the single-color image forming operation started in Step S2 has not been finished yet (S8; NO), a return is made to Step S4 to repeat the process.

Here, the single-color image forming operation means an operation from the start to the end of the output of the laser light representing a formation-target image for one sheet by the optical scanning device 24Bk of black Bk. Alternatively, the single-color image forming operation may mean an operation from the start of the output of laser light representing a formation-target image for one sheet to the discharge of the sheet having the image formed to the sheet discharge unit 40 by the sheet conveying unit 50.

Alternatively, the single-color image forming operation may mean an operation from the start of the output of laser light for the first image formation to the end of the output of laser light for the last image formation when a plurality of single-color images are formed by one image forming job. Alternatively, the single-color image forming operation may mean an operation from the start of the output of laser light for the first image formation to the discharge of the last sheet having an image formed to the sheet discharge unit 40 by the sheet conveying unit 50 when a plurality of single-color images are formed by one image forming job.

On the other hand, if the single-color image forming operation started in Step S2 is finished (S8; YES), the temperature adjuster 86 judges whether or not the total motor driving process is in execution based on whether or not the information indicating the ongoing total motor driving process is stored in the RAM (S9).

If judging that the total motor driving process is not in execution (S9; NO), the temperature adjuster 86 finishes the temperature control of the optical scanning devices 24Y, 24C, 24M and 24Bk of the respective colors of yellow Y, cyan C, magenta M and black Bk. On the other hand, if the temperature adjuster 86 judges that the total motor driving process is in execution in Step S9 (S9; YES), the state discriminator 87 judges whether or not the operating state of the complex machine 1 is the image reading state (S10).

If the operating state of the complex machine 1 is judged to be the image reading state by the state discriminator 87 (S10; YES), the temperature adjuster 86 switches the rotation speed of the polygon motors 66Y, 66C and 66M of the unused optical scanning devices 24Y, 24C and 24M from the first rotation speed V1 to the first individual rotation speed V21 (one of the second rotation speeds) corresponding to the image reading state (S11). The first individual rotation speed V21 corresponding to the image reading state is stored in the storage 88.

The first individual rotation speed V21 corresponding to the image reading state is, for example, determined based on an experimental value such as one obtained in trial operation. Specifically, when the complex machine 1 is in the image reading state and noise is generated by the image reading unit 70 executing the image reading process, the polygon motors 66Y, 66C and 66M of the unused optical scanning devices 24Y, 24C and 24M are driven at the first individual rotation speed V21. The first individual rotation speed V21 corresponding to the image reading state is a rotation speed slower than the first rotation speed V1 and determined to be the rotation speed of the polygon motors 66Y, 66C and 66M when noise after this drive is at a magnitude permissible for users.

On the other hand, if the operating state of the complex machine 1 is judged to be not the image reading state, but the standby state by the state discriminator 87 in Step S10 (S10; NO), the temperature adjuster 86 switches the rotation speed of the polygon motors 66Y, 66C and 66M of the unused optical scanning devices 24Y, 24C and 24M from the first rotation speed V1 to the second individual rotation speed V22 (one of the second rotation speeds) corresponding to the standby state (S12). The second individual rotation speed V22 corresponding to the standby state is stored in the storage 88.

The second individual rotation speed V22 corresponding to the standby state is, for example, determined based on an experimental value such as one obtained in trial operation. Specifically, when the complex machine 1 is in the standby state, neither the image forming operation nor the image reading process is performed and almost no noise is generated, the polygon motors 66Y, 66C and 66M of the unused optical scanning devices 24Y, 24C and 24M are driven at the second individual rotation speed V22. The second individual rotation speed V22 corresponding to the standby state is a rotation speed slower than the first individual rotation speed V21 corresponding to the image reading state and determined to be the rotation speed of the polygon motors 66Y, 66C and 66M when noise after this drive is at a magnitude permissible for users.

Note that, in Steps S11 and S12, the polygon motor 66Bk of the optical scanning device 24Bk of black Bk used for image formation may be immediately stopped after the end of the image forming operation to quickly reduce the temperature differences from the polygon motors 66Y, 66C and 66M of the unused optical scanning devices 24Y, 24C and 24M. Alternatively, the polygon motor 66Bk may be left to rotate until it naturally stops without executing any rotation control of the polygon motor 66Bk after the end of the image formation so that the polygon motor 66Bk can be promptly driven at the scanning rotation speed V0 when the next image formation is immediately performed.

After the execution of Step S11 or S12, the temperature adjuster 86 causes the respective temperature sensors 68Y, 68C, 68M and 68Bk to detect the temperatures near the fθ lenses 65 of the optical scanning devices 24Y, 24C, 24M and 24Bk of the respective colors as in Step S6 and stops the drive of the polygon motors 66Y, 66C and 66M of the unused optical scanning devices 24Y, 24C and 24M that have been started to be driven in Step S5 when the largest temperature difference out of these temperature differences between the temperature detected by the temperature sensor 68Bk of the optical scanning device 24Bk of black Bk and the temperatures detected by the temperature sensors 68Y, 68C and 68M of the unused optical scanning devices 24Y, 24C and 24M falls below the second temperature difference (e.g. 3° C.) (S13; YES). In this way, the temperature adjuster 86 finishes the total motor driving process. Further, the temperature adjuster 86 deletes the information indicating the ongoing total motor driving process from the RAM (S14).

On the other hand, if the largest temperature difference out of the temperature differences between the temperature detected by the temperature sensor 68Bk of the optical scanning device 24Bk of black Bk and the temperatures detected by the temperature sensors 68Y, 68C and 68M of the unused optical scanning devices 24Y, 24C and 24M is not smaller than the second temperature difference (3° C.) in Step S13 (S13; NO), the temperature adjuster 86 does not stop the drive of the polygon motors 66Y, 66C and 66M and returns to Step S9 to repeat the process.

According to the above embodiment, if the temperature condition is judged to be satisfied by the temperature condition judger 85 (S4; YES) when the selection of the single-color image forming mode is received by the mode receiver 84 (S1; YES), the temperature adjuster 86 executes the total motor driving process to drive not only the polygon motor 66Bk of the optical scanning device 24Bk used for image formation, but also the polygon motors 66Y, 66C and 66M of the unused optical scanning devices 24Y, 24C and 24M at the first rotation speed V1 (S5) to also increase the temperatures of the optical scanning devices 24Y, 24C and 24M not used for image formation. This can reduce the temperature differences among the optical scanning devices. As a result, it is possible to reduce a possibility of causing scan position shifts among the optical scanning devices due to temperature differences among the optical scanning devices during the next image forming operation.

Further, if the image forming operation in the single-color image forming mode is finished during the execution of the total motor driving process (S9; YES), the temperature adjuster 86 executes the speed switching process to drive the polygon motors 66Y, 66C and 66M of the unused optical scanning devices 24Y, 24C and 24M after switching the rotation speed thereof to the first or second individual rotation speed V21 or V22 slower than the first rotation speed V1 (S11, S12).

This can reduce noise generated by driving the polygon motors 66Y, 66C and 66M of the unused optical scanning devices 24Y, 24C and 24M from noise during the image forming operation after the image forming operation is finished during the execution of the total motor driving process (S8; YES and S9; YES). As a result, it is possible to reduce a possibility of causing scan position shifts among the optical scanning devices due to temperature differences among the optical scanning devices during the next image forming operation by reducing the temperature differences among the respective optical scanning devices while avoiding that quietness is largely impaired.

Further, in the case of executing the speed switching process, the temperature adjuster 86 drives the polygon motors 66Y, 66C and 66M of the unused optical scanning devices 24Y, 24C and 24M at the first individual rotation speed V21 or the second individual rotation speed V22 corresponding to the operating state discriminated by the state discriminator 87 (S11, S12). This enables the magnitude of noise generated by driving the polygon motors 66Y, 66C and 66M of the unused optical scanning devices 24Y, 24C and 24M during the execution of the speed switching process to be appropriately switched according to the operating state of the complex machine 1.

For example, the second individual rotation speed V22 corresponding to the standby state is determined to be slower than the first individual rotation speed V21 corresponding to the image reading state as described in the above specific example. This can make the magnitude of noise generated by the execution of the speed switching process smaller in the standby state where noise is smaller than in the image reading state since no image reading process is executed than in the image reading state.

Further, if the drive of the polygon motors 66Y, 66C and 66M of the unused optical scanning devices 24Y, 24C and 24M is continued even after the temperature differences among the respective optical scanning devices 24 become smaller than the second temperature difference during the execution of the total motor driving process (S6; YES, S13; YES), the temperatures of the unused optical scanning devices 24Y, 24C and 24M are increased more than necessary. As a result, the temperature differences among the respective optical scanning devices may be reduced more than necessary. However, according to the above embodiment, if the temperature differences among the respective optical scanning devices 24 become smaller than the second temperature difference during the execution of the total motor driving process (S6; YES, S13; YES), the temperature adjuster 86 finishes the total motor driving process by stopping the polygon motors 66Y, 66C and 66M of the unused optical scanning devices 24Y, 24C and 24M (S7, S14). Thus, it can be avoided that the temperature differences among the optical scanning devices 24 are reduced more than necessary.

Note that, in the above embodiment, the temperature sensor 68 is disposed outside the laser light path and within the predetermined short distance from the fθ lens 65. However, the disposed position of the temperature sensor 68 is not limited to that in the above embodiment.

For example, the temperature sensor 68 may be disposed in contact with an end part of the fθ lens 65 and, thereby, may detect the temperature of the fθ lens 65 itself. Alternatively, the temperature sensor 68 may be arranged at a position as close to the fθ lens 65 as possible in the housing of the optical scanning device 24 if there is no space to dispose the temperature sensor 68 near the fθ lens 65.

The closer to the fθ lens 65 the temperature sensor 68 is arranged, the more accurately the temperature of the fθ lens 65 can be detected. This enables differences in the refractive index of the fθ lens 65 among the respective optical scanning devices 24 to be accurately reduced by accurately reducing differences in the temperature near the fθ lens 65 among the respective optical scanning devices 24 by the above temperature control.

Note that the present disclosure can be modified in various manners without being limited to the configuration of the above embodiment. The configurations and processes shown in FIGS. 1 to 6 are merely illustration of the embodiment according to the present disclosure and not of the nature to limit the present disclosure to the above embodiment.

For example, if the judgment result of Step S9 is affirmative (S9; YES), the state discriminator 87 may discriminate the operating state of the complex machine 1 after image formation while more finely classifying it instead of Steps S10, S11 and S12. For example, the state discriminator 87 may discriminate the image reading state by further classifying it into two operating states depending on whether an image of a document placed on the document platen 72 is read by the scanner 71 or a plurality of documents stacked on the document placing portion 73 are successively fed onto the reading window 74 and images of the documents are read by the scanner 71 at the position of the reading window 74.

In accordance with this, the second rotation speed corresponding to each of the above further classified operating states may be stored in the storage 88. The second rotation speed corresponding to each of the above further classified operating states may be set at a rotation speed, which is slower than the first rotation speed and is the rotation speed of the polygon motors 66 of the unused optical scanning devices when noise of a magnitude permissible for users is generated when the polygon motors 66 of the unused optical scanning devices are driven in the case where the complex machine 1 is set in each operating state, for example, based on an experimental value such as one obtained in trial operation.

If the judgment result in Step S9 is affirmative, the temperature adjuster 86 may cause the state discriminator 87 to discriminate in which of the further classified operating states the complex machine 1 is set and switch the rotation speed of the polygon motors 66 of the unused optical scanning devices to the second rotation speed stored in the storage 88 and corresponding to the discriminated operating state.

Further, the control unit 80 may have a simplified configuration which functions without including the state discriminator 87 and the storage 88. In accordance with this, the execution of Steps S10, S11 and S12 (FIG. 5) may be omitted and, if the judgment result in Step S9 is affirmative (S9;YES), the rotation speed of the polygon motors 66 of the unused optical scanning devices in the total motor driving process may be switched to a silent rotation speed V4 slower than the first rotation speed V1.

A modification simplified by not executing Steps S6 (FIG. 4), S7 (FIG. 4), S13 (FIG. 5) and S14 (FIG. 5) may be adopted.

Further, in the above embodiment, the complex machine 1 has been described as an example of the image forming apparatus according to the present disclosure. The present disclosure can also be applied to copiers, facsimile machines and color printers which are capable of color printing. Further, although the tandem color complex machine 1 in which the image forming units 21Y, 21C, 21M and 21Bk are arranged substantially in the horizontal direction has been described as an example in the above embodiment, another printing method may be adopted if the image forming apparatus is of a type including a plurality of optical scanning devices for scanning a photoconductor with laser light.

According to the present disclosure as described above, it is possible to provide an image forming apparatus capable of reducing a possibility of causing scan position shifts among respective optical scanning devices due to temperature differences among the respective optical scanning devices without largely impairing quietness.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. An image forming apparatus including a plurality of optical scanning devices arranged in correspondence with a plurality of photoconductors, configured to scan the corresponding photoconductors with laser light, comprising:
    an optical scanning device including
        a light source for emitting laser light,
        a rotational polygon mirror for reflecting the laser light output from the light source to scan the photoconductor,
        a motor for rotating the rotational polygon mirror, and
        a temperature detector for detecting temperature of the optical scanning device;
    a mode receiver for receiving selection of a single-color image forming mode for forming an image using only one of the plurality of optical scanning devices;
    a temperature condition judger for judging whether or not a largest temperature difference out of temperature differences between temperature detected by the temperature detector of the one optical scanning device used in the received single-color image forming mode and temperatures detected by the temperature detectors of unused other optical scanning devices satisfies a temperature condition of being larger than a predetermined first temperature difference; and
    a temperature adjuster for performing an image forming operation in the single-color image forming mode and executing a total motor driving process to drive the motors of the other optical scanning devices at a predetermined first rotation speed if the temperature condition is judged to be satisfied by the temperature condition judger and executing a speed switching process to drive the motors of the other optical scanning devices at a second rotation speed slower than the first rotation speed if the image forming operation in the single-color image forming mode is finished during the execution of the total motor driving process when the selection of the single-color image forming mode is received by the mode receiver.

2. An image forming apparatus according to claim 1, further comprising:
    a state discriminator for discriminating in which of a plurality of possible operating states except the execution of the image forming operation the image forming apparatus is set; and
    a storage for storing an individual rotation speed determined to correspond to each operating state as the second rotation speed for each operating state in advance;
    wherein the temperature adjuster drives the motors of the other optical scanning devices at the individual rotation speed stored in the storage and corresponding to the operating state discriminated by the state discriminator when executing the speed switching process.

3. An image forming apparatus according to claim 2, further comprising an image reading unit for executing an image reading process for reading an image of a document, wherein:
    the plurality of operating states include an image reading state in which the image reading process is executed and a standby state in which the image reading process is not executed; and
    a second individual rotation speed stored in the storage and corresponding to the standby state is a rotation speed slower than a first individual rotation speed stored in the storage and corresponding to the image reading state.

4. An image forming apparatus according to claim 1, wherein:
    the temperature adjuster finishes the total motor driving process by stopping the motors of the other optical scanning devices when the largest temperature difference out of the temperature differences between the temperature detected by the temperature detector of the one optical scanning device and the temperatures detected by the temperature detectors of the other optical scanning devices becomes smaller than a second temperature difference smaller than the first temperature difference during the execution of the total motor driving process.

5. An image forming apparatus according to claim 1, wherein:
    the optical scanning device includes an optical lens made of resin and configured to focus the laser light on a surface of the photoconductor; and
    the temperature detector detects the temperature of the optical lens or temperature near the optical lens.

6. An image forming apparatus according to claim 5, wherein:
    the optical lens is an f$\theta$ lens.

* * * * *